United States Patent
Schafer

(10) Patent No.: US 7,096,900 B2
(45) Date of Patent: Aug. 29, 2006

(54) TREE CUTTING ATTACHMENT FOR WORK VEHICLE

(75) Inventor: William C. Schafer, Hector, MN (US)

(73) Assignee: Loftness Specialized Equipment, Inc., Hector, MN (US)

( * ) Notice: Subject to any disclaimer, the term of this patent is extended or adjusted under 35 U.S.C. 154(b) by 326 days.

(21) Appl. No.: 10/827,705

(22) Filed: Apr. 20, 2004

(65) Prior Publication Data

US 2004/0244869 A1 Dec. 9, 2004

Related U.S. Application Data

(63) Continuation-in-part of application No. 10/454,144, filed on Jun. 4, 2003, now Pat. No. 6,871,485.

(51) Int. Cl.
*A01G 23/08* (2006.01)

(52) U.S. Cl. .................. 144/4.1; 144/34.1; 144/24.12; 144/24.13

(58) Field of Classification Search .................. 56/249, 56/294, 504, DIG. 12, 252, 156; 144/34.1, 144/4.1, 334, 335, 336, 24.12, 24.13; 241/193, 241/194
See application file for complete search history.

(56) References Cited

U.S. PATENT DOCUMENTS

| | | | |
|---|---|---|---|
| 1,312,450 A | | 8/1919 | McKoy et al. |
| 4,259,834 A | * | 4/1981 | Lambert et al. ............... 56/504 |
| 4,355,670 A | | 10/1982 | Ohrberg et al. |
| 4,878,713 A | | 11/1989 | Zanetis |
| 4,905,460 A | * | 3/1990 | Toman ........................ 56/12.7 |
| 5,003,759 A | * | 4/1991 | Brown ......................... 56/249 |
| 5,005,344 A | | 4/1991 | McCracken |
| 5,060,732 A | | 10/1991 | Baskett |
| 5,435,117 A | | 7/1995 | Eggena |
| 5,472,147 A | * | 12/1995 | Doppstadt ................... 241/88.4 |
| 5,480,351 A | * | 1/1996 | Coleman ...................... 460/72 |
| 5,495,987 A | | 3/1996 | Slaby |
| 5,499,771 A | | 3/1996 | Esposito et al. |
| 5,505,268 A | | 4/1996 | McPherson et al. |
| 5,666,794 A | | 9/1997 | Vought et al. |

(Continued)

*Primary Examiner*—Árpád Fábián Kovács
(74) *Attorney, Agent, or Firm*—Nikolai & Mersereau, P.A.; Thomas J. Nikolai

(57) ABSTRACT

A tree cutting attachment for a skid loader or other types of self-propelled work vehicles to be used at construction and landscaping sites. The device is used to cut down brush and trees of up to about 12 inches in diameter. The tree cutting attachment is made up of a motor driven rotor assembly which is journaled within a frame of the attachment. The rotor assembly comprises a cage-like mounting system having pockets in which tempered steel blades, approximately ten inches in width are bolted in a side-by-side relation. Two rows of blades are mounted 180 degrees apart proximate the periphery of a rotor comprised of a series of parallel, generally circular plates that are welded to longitudinally extending rods. The knife blade elements are bolted to the blade holders with the non-sharpened end of the blade elements abutting a flat steel bar that forms part of the cage. In a second embodiment, the frame comprises a stationary portion adapted to be rigidly affixed to the hitch of the work vehicle and a movable portion that can be pivoted relative to the stationary portion. Because the movable portion is arranged to pivot about the powered drive shafts, tiling of the movable portion to bring the cutting blade rotor into engagement with a tree to be felled does not alter drive belt tension.

15 Claims, 14 Drawing Sheets

U.S. PATENT DOCUMENTS

| | | |
|---|---|---|
| 5,706,638 A | 1/1998 | Kinder et al. |
| 6,116,699 A | 9/2000 | Kaczmarski et al. |
| 6,138,444 A | 10/2000 | Torras, Sr. |
| 6,227,469 B1 * | 5/2001 | Daniels et al. ........... 241/186.3 |
| 6,321,518 B1 * | 11/2001 | O'Hagan ..................... 56/294 |

* cited by examiner

TREE CUTTING ATTACHMENT FOR WORK VEHICLE

CROSS REFERENCE TO RELATED APPLICATIONS

This application is a continuation-in-part of application Ser. No. 10/454,144, filed Jun. 4, 2003 now U.S. Pat. No. 6,871,485.

BACKGROUND OF THE INVENTION

1. Field of the Invention

This invention relates generally to a tree cutting machine, and more particularly to a tree cutting machine which serves as an attachment for a work vehicle, such as a skid loader or tractor.

2. Discussion of the Prior Art

Clearing areas of brush and trees in an efficient and effective manner has long been a challenge to construction and landscaping workers. A machine capable of performing these tasks would be a valuable tool for difficult and challenging development jobs.

In response to this need, several rotary cutting attachments that could be used on vehicles were devised. One such device is disclosed in U.S. Pat. No. 4,355,670. This device comprises a large diesel truck with a tree felling attachment drum and assembly driven by a hydraulic motor. Its attached cutting assembly has a unique drum construction. The drum's complex mounting structure, fragmenting elements, cutting means, teeth etc. make this an original invention, vastly different in operation from the present invention. U.S. Pat. No. 5,499,771 is a related design comprising a tree cutting attachment which cuts, clips, and mulches trees with a set of cutting teeth. This varies from the present invention that implements a shaving technique. Another, closely related, prior art design is U.S. Pat. No. 1,312,450. This machine discloses disintegration of a tree stumps using a rotary attachment but operates as a large and complex group of belts, gears, and levers.

To enable the present invention to be most widely used, it was designed to attach to a skid steer vehicle, tractor or other type of work vehicle. Skid steer vehicles are compact, highly maneuverable vehicles which are controlled by an operator seated within the operator compartment by actuating a pair of steering levers. Attachments, such as an auger, grapple, sweeper, landscape rake, snow blower or backhoe, some of which may include a hydraulic motor, are sometimes mounted to a boom assembly on the front of the skid steer loader. An auxiliary hydraulic system is used to control the flow of hydraulic fluid between the skid steer vehicle auxiliary hydraulic pump and the hydraulic motor on the front mounted attachment. This actuates hydraulic cylinders that position the front mounted attachments.

Various designs have been made with respect to attachments for skid-steer vehicles including those disclosed in U.S. Pat. Nos. 5,666,794 and 4,878,713. These devices mount to a skid-steer vehicle but are designed to be a flail mower and pavement planing machine, respectively, and do not perform needed tree cutting and brush clearing functions.

Therefore, what is needed is the tree cutting machine of the present invention which effectively allows for easy and efficient tree and brush clearing with an improved rotary cutting design over past inventions.

SUMMARY OF THE INVENTION

The present invention provides for a tree cutting attachment for use with a skid loader or other type of self-propelled work vehicle at construction and landscaping sites. The tree cutting attachment comprises a motor driven rotor assembly journaled within the frame of the attachment. The rotor assembly comprises a cage-like mounting system having a plurality of pockets in which tempered steel blades are bolted in a side-by-side relation. Two rows of blades are mounted 180 degrees apart proximate the periphery of the rotor. The rotor also includes a series of parallel, generally circular plates that are welded to longitudinally extending rods. Located between adjacent ones of the plates are blade holders. In accordance with a first embodiment, the knife blade elements are bolted to the blade holders. The blade elements are affixed to the blade holders by bolts that can be removed to accommodate blade replacement. A gap between the blades' cutting edges and an elongated shear bar can be set to define a desired depth-of-cut. The shear bar is adjustably affixed to the frame in which the rotor is mounted.

In accordance with an alternative embodiment, the frame includes a stationary portion adapted to attach to the work vehicle and a movable portion that is hinged to the stationary portion so as to be rotatable. The movable portion carries the rotor assembly having the cutting blades. A gearbox having oppositely extending driven shafts and preferably powered from the work vehicle PTO shaft provides motive power to the rotor assembly. Because the movable frame is able to pivot, the rotor with its cutter bladders can be tilted to gain better purchase with the trees and brush being cut down and ground.

The invention includes a deflector assembly joined to the frame. It carries a plurality or short lengths of chain across the front of the device. It functions to prevent debris from projecting forward when cutting brush. The present invention also includes a pusher member made up of a framework of bars which cause cut trees to fall forward when they are severed.

These and other objects, features, and advantages of the present invention will become readily apparent to those skilled in the art through a review of the following detailed description in conjunction with the claims and accompanying drawings in which like numerals in several views refer to the same corresponding parts.

DESCRIPTION OF THE DRAWINGS

FIG. 11C shows a cutting height of approximately 18" below ground level and FIG. 11D shows approximately 46" above ground level.

DESCRIPTION OF THE PREFERRED EMBODIMENT

Figure 1:
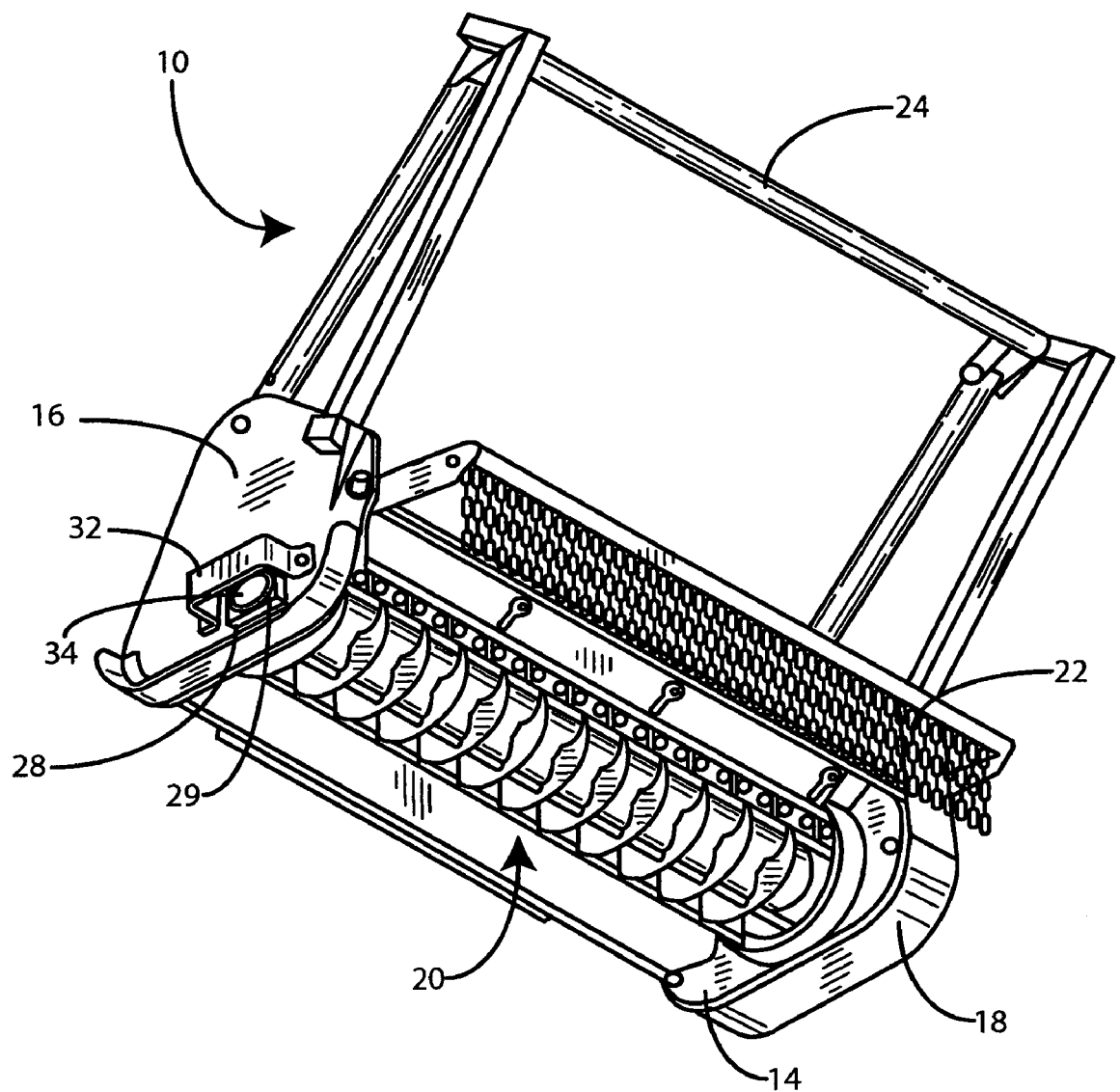
FIG. 1 is a perspective view of the front and right sides of a first embodiment of the tree cutting attachment of the present invention.

The present invention represents broadly applicable improvements for tree cutting attachments. The embodiments herein are intended to be taken as representative of those in which the invention may be incorporated and are not intended to be limiting.

Certain terminology will be used in the following description for convenience in reference only and will not be limiting. The words "upwardly", "downwardly", "rightwardly" and "leftwardly" will refer to directions in the drawings to which reference is made. The words "inwardly" and "outwardly" will refer to directions toward and away from, respectively, the geometric center of the device and associated parts thereof. Said terminology will include the words above specifically mentioned, derivatives thereof and words of similar import.

Referring first to FIG. 1, there is shown a perspective view of the front and left sides of a first embodiment of a tree cutting attachment for a skid loader or other type of self-propelled work vehicle. The assembly itself is indicated generally by numeral 10. It includes a housing or shroud 12, left side panel 14, right side panel 16, pulley cover 18, rotor assembly 20, chain deflector 22, and pusher member 24.

Figure 2:
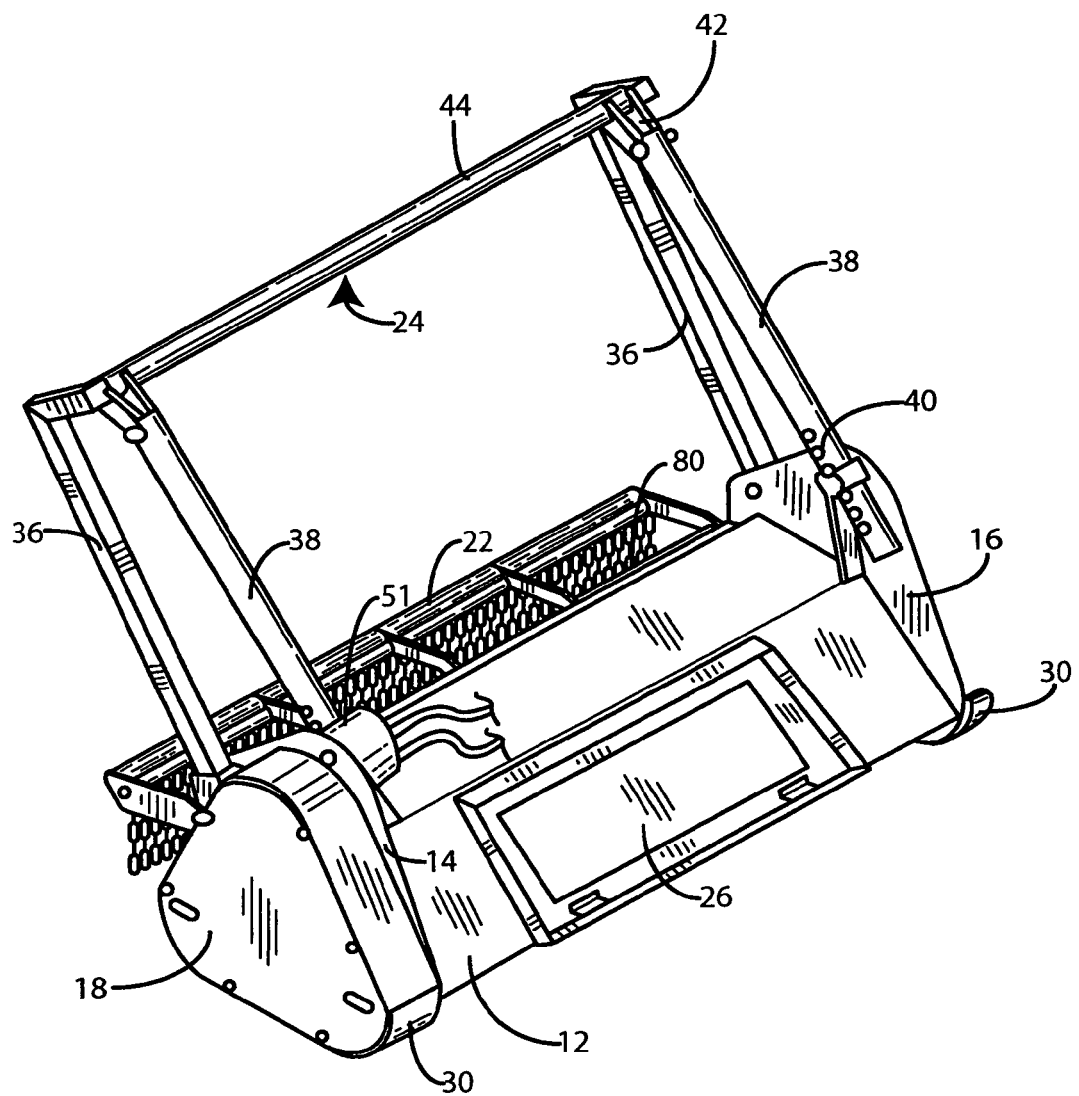
FIG. 2 is a perspective view of the back and left sides of the tree cutting attachment of the embodiment of FIG. 1.

With reference to FIG. 2, the tree cutting attachment is seen in a perspective view of the rear and left sides. The housing or shroud 12 shown is basically a piece of sheet metal bent into, roughly, a wedge-like shape, open on the front and bottom sides. On the rear side of the housing is the skid loader quick-attachment mount 26. The skid loader mount 26 pivotally mounts to the lift arms of a skid loader, as is well known in the art. Those skilled in the art will recognize that other types of quick attach mounts can be used to couple the tree/brush cutter to work vehicles other than skid loaders.

On the sides of shroud 12 are left end panel 14, and right end panel 16. These are four-sided pieces of sheet metal with rounded corners. These panels contain several holes around their perimeters for attachment to the shroud 12, as well as a large hole 28 near the bottom center of the panels containing bearings 29 for journaling the rotor assembly. (See FIG. 1.) Both left and right panels 14 and 16 have a U-shaped metal skid 30 protruding in a perpendicular direction from side surface at a lower edge thereof. The left panel has a triangular-shaped cover 18 placed over it. This cover shields the elements contained beneath it. Mounted on the panel 16 is a shield bracket 32, which juts out and around the bearings 29 and the rotor shaft 34 journaled therein.

Also shown in FIG. 2 is pusher member 24. Pusher member 24 is a safety structure, which is designed to push against the trunk of a tree as it is being cut and prevents it from falling onto the cab of the skid vehicle. The pusher member 24 has two pairs of legs pivotally mounted to left and right panels 14 and 16. The front most two legs 36 are rigid, L-shaped members. A crossbar 44 of the pusher member 24 extends between the rearmost two legs 38 which are straight, metal bars, preferably of square-shape cross section. There are several holes 40 in the lower end of the bars 38 allowing adjustment of the angle at which the pusher projects from the cutting assembly. The top ends of the rearmost legs 38 are pivotally engaged with small linking pieces 42. These linking pieces attach near the ends of pusher member bar 44 as best seen in FIG. 2.

Figure 3:
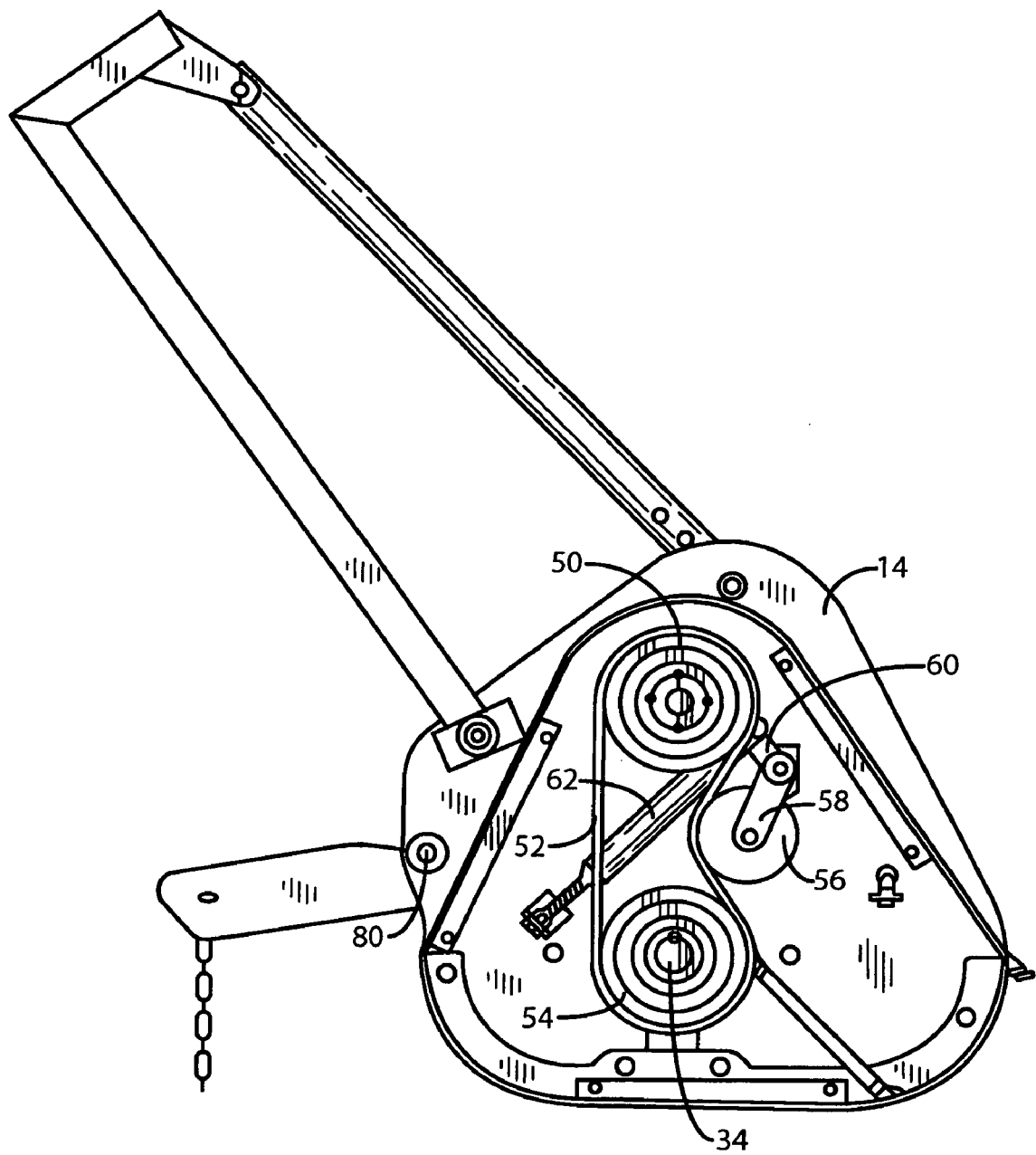
FIG. 3 is a left side cross-sectional view of the embodiment of FIG. 1.

FIG. 3 is a left side view of the tree cutting attachment, as seen when the pulley cover 18 is removed from left side panel 14 to expose the internal components. The internal components are the parts which transfer power to the rotor cutting assembly 20. More specifically, a drive pulley 50 is located near the top of left side panel 14. It is mounted on the shaft of a hydraulic motor (not shown) bolted to the opposite side of the panel 14. The hydraulic motor 51 is driven from a hydraulic pump (not shown) coupled to the power take off of the self-propelled work vehicle to which the tree/brush cutting is being connected. The drive pulley 50 rotates a belt 52 wrapped around the cutter shaft pulley 54. The cutter shaft pulley 54 is located directly below drive pulley 50 near the bottom of left side panel 14. Drive pulley 50 when driven by the hydraulic motor places a large torque upon rotor shaft 34 to which the drive pulley 54 is keyed. The torque driven rotor shaft 34 causes the rotor assembly 20 with its cutting knives to be rotated in the frame. The rotor assembly 20 will be discussed in greater detail below.

The belt 52 transfers power from the hydraulic motor to the rotor assembly and is made of a cord reinforced elastomeric material. It is tightly engaged against the two pulleys 50 and 54 because of a tensioning pulley 56. This pulley 56 acts as a belt tightener and prevents belt slippage that would adversely affect the amount of torque placed upon drive pulley 54. The belt tensioning pulley 56 pivotally attaches to a bracket 58 which then pivotally mounts to another link segment 60. The link segment 60 is attached to a tube and threaded rod tightening component 62. The bolt on component 62 can be adjusted to either tighten or loosen the belt engagement around the pulleys.

Figure 4:
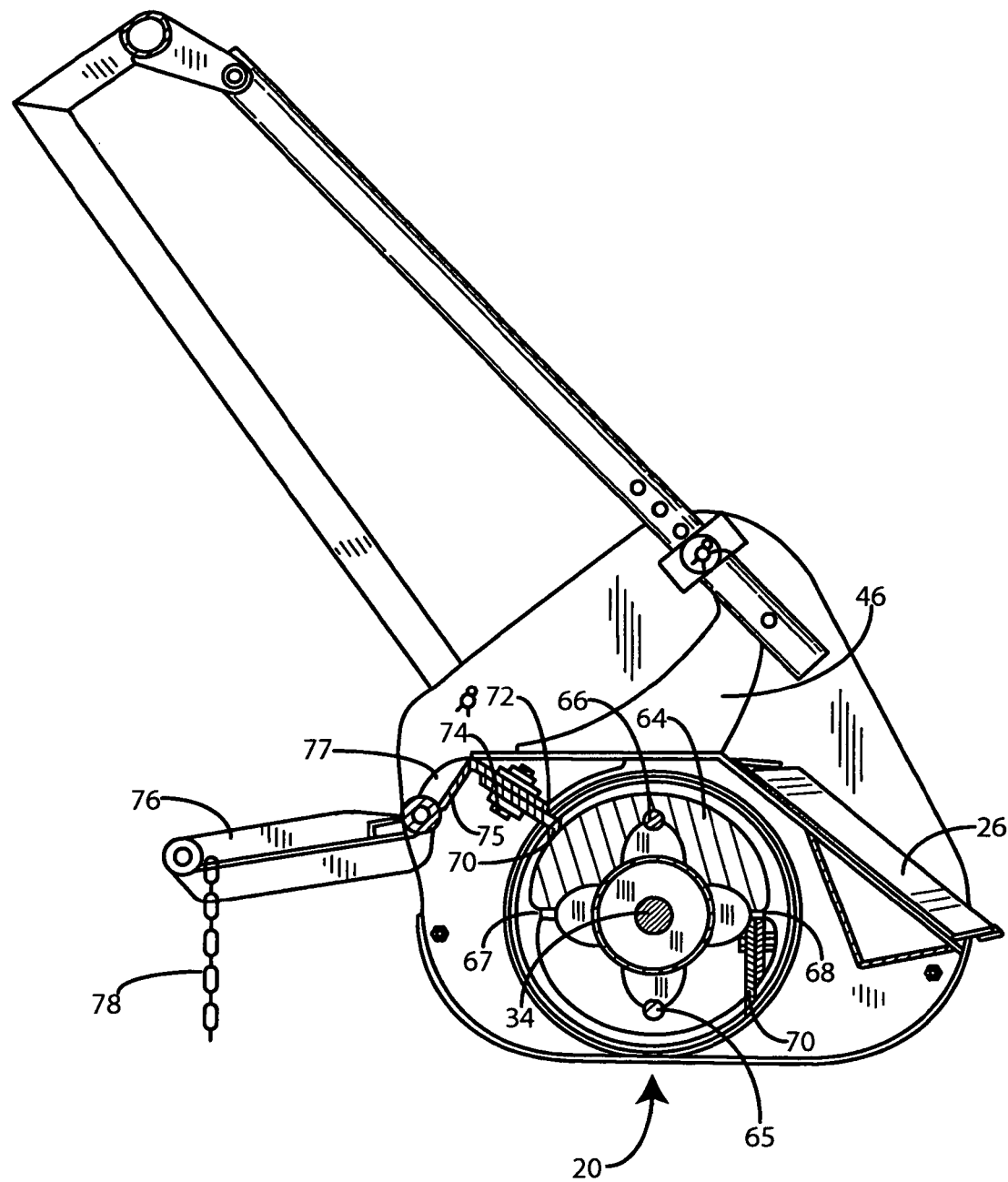
FIG. 4 is a further cross-sectional view of the invention taken through the rotor.

Referring now to FIG. 4, another cross-section of the tree cutting attachment is shown. The backside of the quick-attachment mount 26 is adapted to engage with the arms of a skid loader vehicle. The rotor assembly 20 is journaled for rotation in bearings 29 set in the side plates 14 and 16. This assembly is made up of a generally cylindrical framework of metal bars, spacer plates and knives. At the center of this framework is the rotor shaft 34. Surrounding the shaft is a series of disc-like spacer plates 64, held in parallel relation by four metal bars, equally spaced around the disc perimeter and to which the spacer plates 64 are welded. Two of the metal bars 65 and 66 are of a circular cross-section and rod-like, and two of the bars 67 and 68 have a rectangular cross-section. The circular rods 65 and 66 are located opposite one another and help to provide stability and rigidity to the assembly. The rectangular bars 67 and 68 also provide stability and additionally form back-up plates for the knife blades 70 that are mounted diametrically around the periphery of the assembly. Trees and brush enter the rotor assembly from the left in FIG. 4 and then are shaved down to small pieces by the spinning action of the cutting blades. The rotor assembly will be discussed further with the aid of FIG. 5. Positioned adjacent the perimeter of the rotor assembly is a adjustable shear bar 72. This adjustable shear bar 72 acts as an anvil controls the depth of cut and the size of the wood chips produced as the rotor assembly is driven.

The distance between the tips of the rotating knives 70 and the tip of shear bar 72 govern the chip size, which can be varied by setting the adjustable shear bar 72. A bolt 74 passes through a slotted aperture in the angle bracket 77. Setting the shear bar 72 to a minimum knife clearance reduces feed rate, particle size, and horsepower required. Setting the shear bar 72 to the maximum knife clearance increases the feed rate, particle size and horsepower required.

In FIG. 4, trees and brush enter the assembly from the left side and are shaved down as they move to the right. The panel projecting out from the front of the assembly serves as a brush deflector 76 to the shaved chips. A plurality of short, closely-spaced, individual lengths of chain 78 hang down in a line from the brush deflector 76. The brush deflector 76 and the hanging chains 78 serve to stop chips from projecting out of the device at high velocity when it is in operation.

Figure 5:
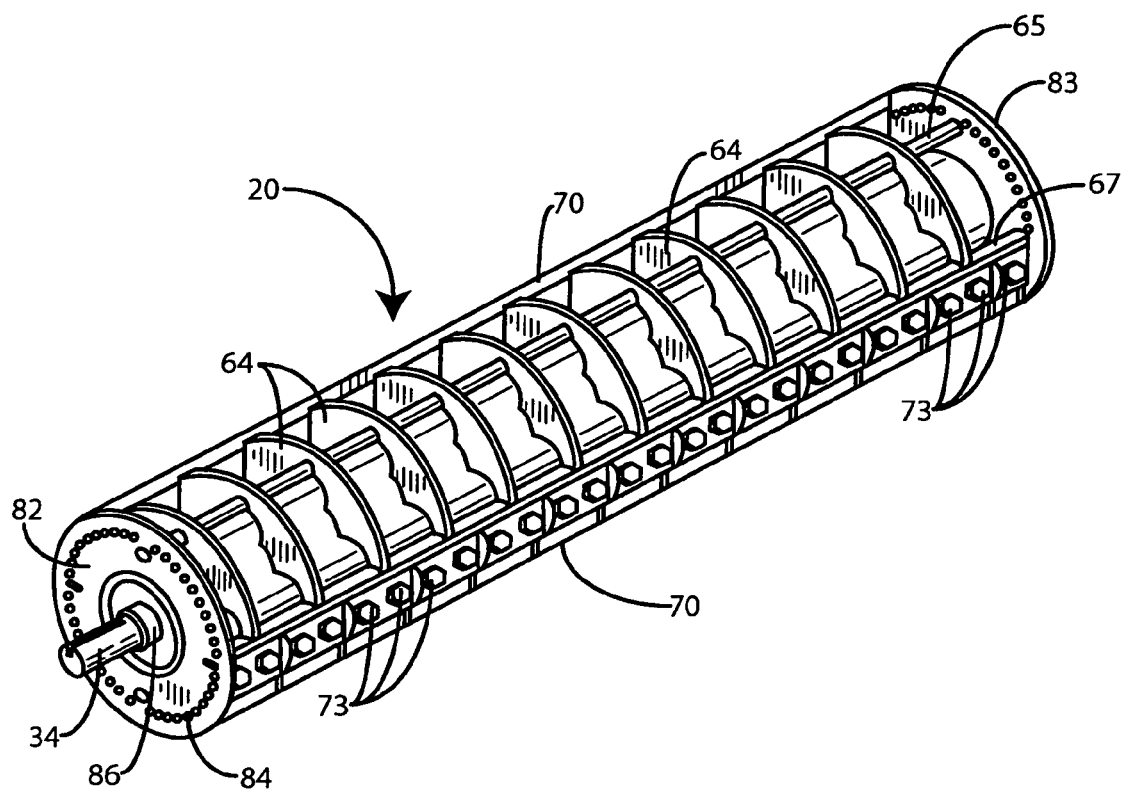
FIG. 5 is a perspective view of the rotor assembly employed in the preferred embodiment of FIG. 1.

FIG. 5 is a detail view of the rotor assembly 20 of the present invention removed from its housing 12. The rotor components are mounted and rotate with driven rotor shaft 34. As mentioned, this driven shaft is journaled by bearings affixed to side plates 14 and 16. Along the length of the shaft is a plurality of regularly spaced disc components 64. These disk components are axially spaced on the shaft 34 and provide the assembly with a caged, generally cylinder-like shape. Around the periphery of these discs are the four rods 65, 66, 67, 68 holding the discs 64 in place, as discussed earlier with reference to FIG. 4. Extending tangentially from the periphery of the discs 64 are knife blades 70. The knife blades 70 comprise short, generally rectangular metal plates of tool steel which may be in a range of from six to ten inches in width. They are bolted on diametrically opposite sides of the rotor assembly so as to provide proper balance. These blades may be placed in the pockets in between the discs 64 with one end of the blades abutting up against the rectangular bar shaped rods 67 or 68. Because of the structural rigidity of the blades mounted in pockets and abutting against the rectangular rods, severe impact forces seen by the knife mounting bolts 73 are absorbed, reducing the chance of shearing of the retaining bolts. If opposed end edges of the blades are both sharpened to allow for reversing when one edge becomes dull, it may be desirable to bolt the blades to the blade holders such that the sharpened end of the blade facing inward does not abut the bars 67 or 68.

Another important feature of the tree cutting attachment of the present invention includes the way that the leading edge of angle bar 77 keeps uncut material from being propelled up and forward, away from the knives. Maintaining contact with the knives helps to continue the feed of new wood material to the knives. The flat, back side of the "L" shaped angle bar 77 helps control overfeeding caused by uncut material being pulled in at an uncontrolled rate as in the case of the tapered or wedge shaped chamber present in prior art designs, thereby reducing horsepower requirements.

Both the rectangular bar shaped rods 67 and 68 and the cylindrical rods 65 and 66 mount in the two circular end plates 82 and 83. There is a grouping of holes 84 around the outside perimeter of these circular end plates for attachment of balancing weights if required to inhibit vibration of the cutter rotor assembly. The center holes 86 of the end plates 82 and 83 enable the rotor shaft 34 to extend through the end plates.

The operation of the tree cutting attachment for a skid loader is as follows. First, the tree cutting attachment is mounted to a skid loader utilizing the conventional skid loader mount 26. The operator of the skid loader turns on the hydraulic motor 51 coupled to the work vehicle's hydraulic pump causing the drive pulley to rotate. A belt transfers power from the drive pulley 50 to the shaft pulley 54 and, in turn, rotates the rotor assembly 20 with its knives 70 in the direction opposite that of ground travel at about 1700 rpm. Because the rotor 20 is made to rotate in a direction so that its bottom is moving in a direction opposite to the ground travel of the skid loader, the rotating blades tend to lift the downed tree from the ground, facilitating the shredding action.

When the tree cutting attachment is lowered and is driven into brush, the brush deflector 76 is adjusted by tilting the arms of the skid loader to a position where the structure and chains are able to deflect stones and other debris downward. When the material comes into contact with the brush, it is lifted upward and cut by the rotating knives. The cut residue is then discharged over the top of the rotor and out the back of the assembly.

When cutting down a tress, the operator elevates the arms of the skid loader to lift the attachment 10 to a desired height. As the rotor 20 is driven, the two rows of blades 70 shave through the trunk of the tree as the pusher 24 applies a force to the tree trunk above the level it is being cut so as to cause it to fall forward as the trunk is ultimately shoved to the breaking point. Once felled, the operator may operate the skid loader so as to run the rotor mounted blades back and forth over the trunk until it is reduced to chips or shavings which more readily decompose.

ALTERNATIVE EMBODIMENT

Figure 6:
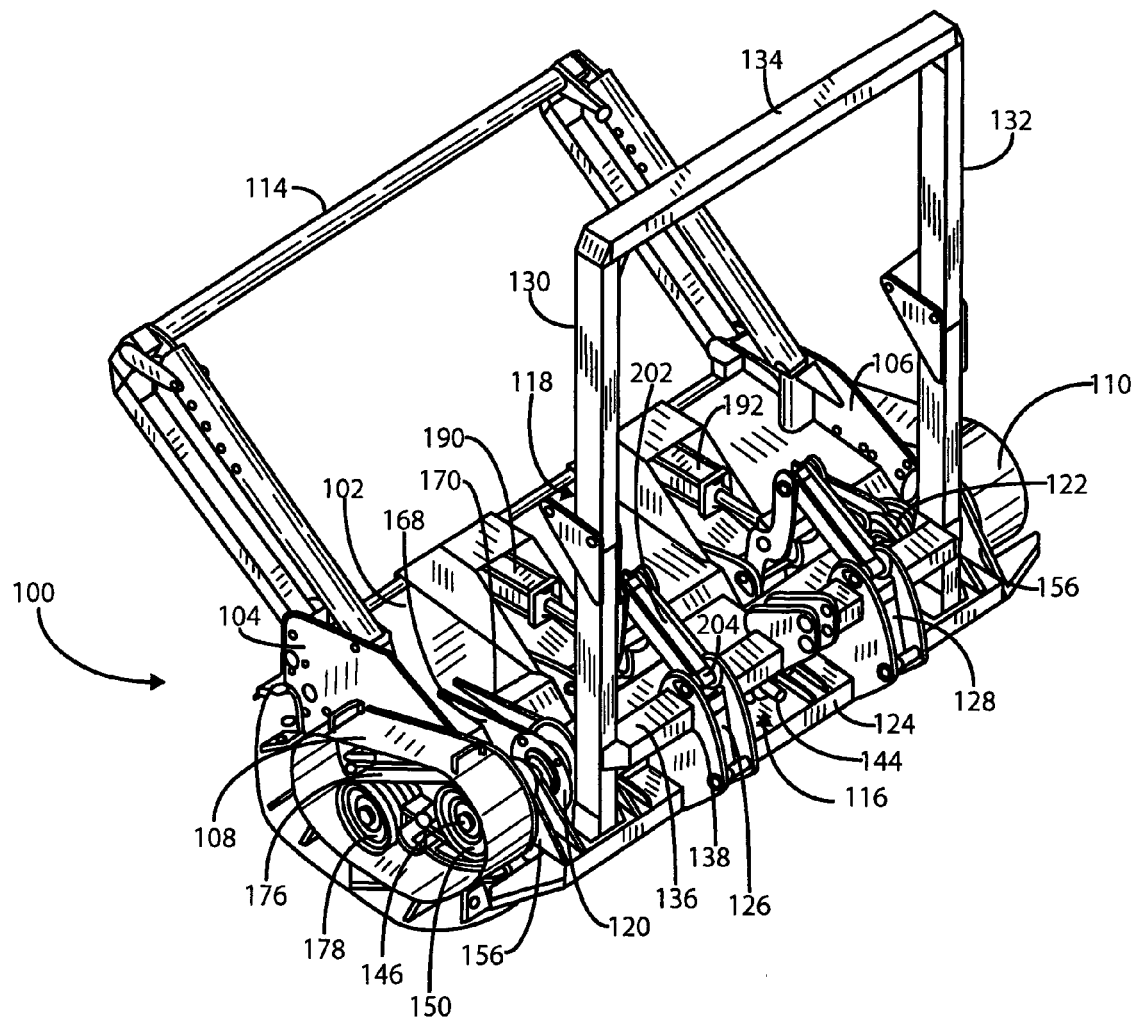
FIG. 6 is a perspective view of an alternative embodiment of the invention.
Figure 7:
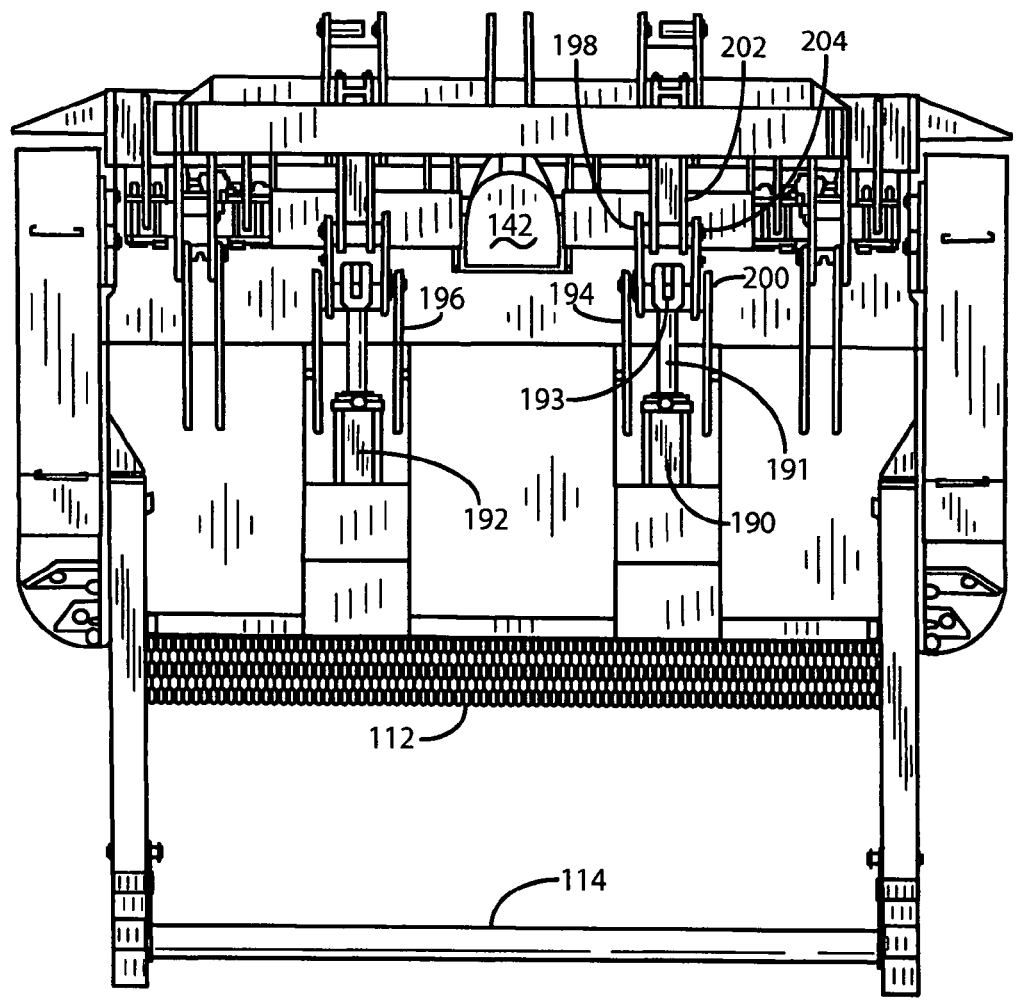
FIG. 7 is a top elevation view of the embodiment of FIG. 6.

FIG. 6 shows a perspective view of an alternative embodiment of a tree cutting attachment for a self-propelled work vehicle. The assembly itself is indicated generally by numeral 100 and it includes a housing or shroud 102, a left side panel 104, a right side panel 106, pulley covers 108 and 110, a rotor assembly that is hidden from you by the shroud or cover 102, but which is substantially identical in construction to the rotor assembly 20 used in the embodiment of FIG. 1. There is no need to repeat the description of its construction. Also, like the embodiment of FIGS. 1–5, the alternative embodiment also includes a chain deflector 112 (FIG. 7) and a pusher member 114.

Figure 9:
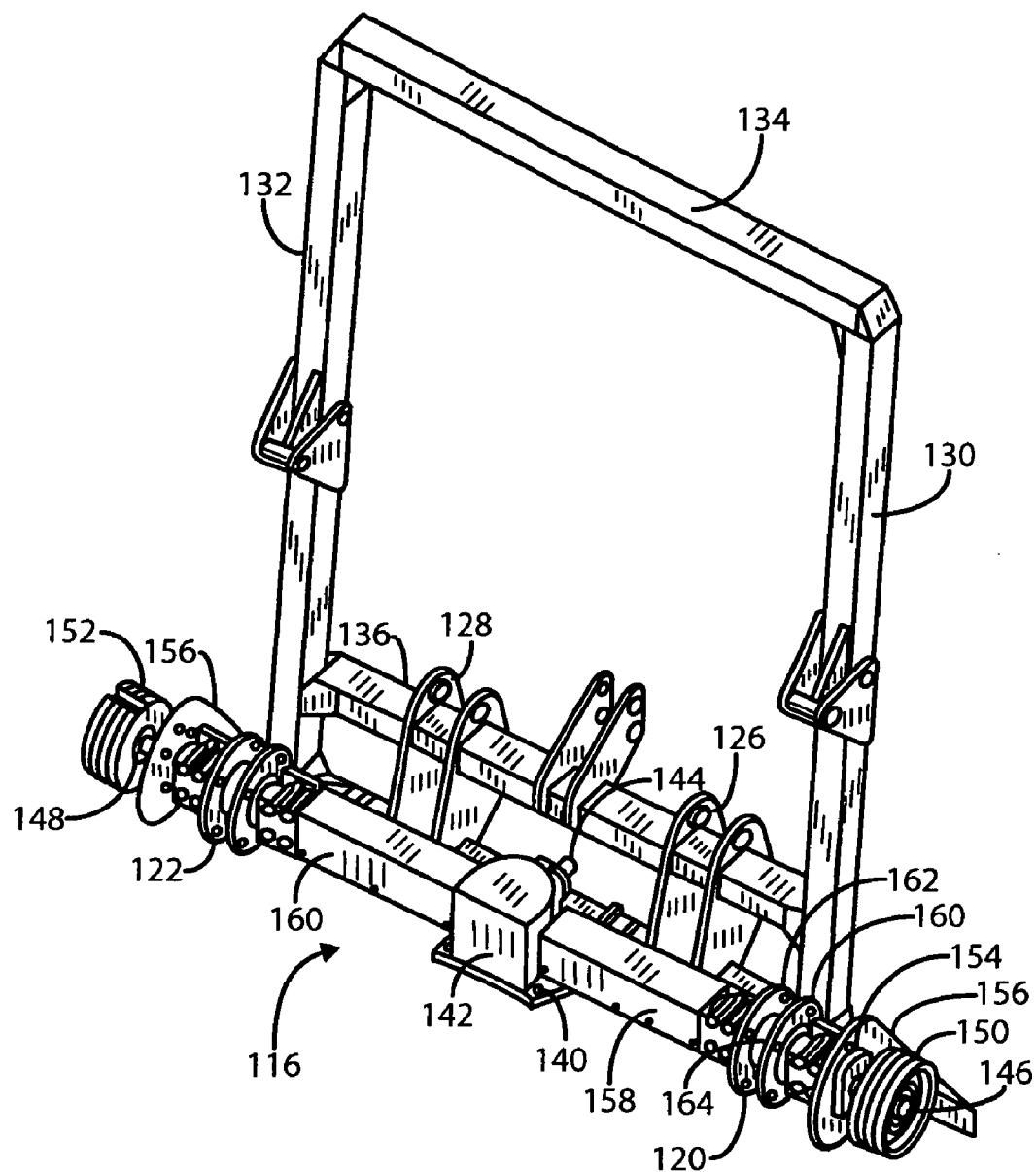
FIG. 9 is a detailed view of the fixed portion of the frame of the embodiment of FIG. 6.
Figure 10:
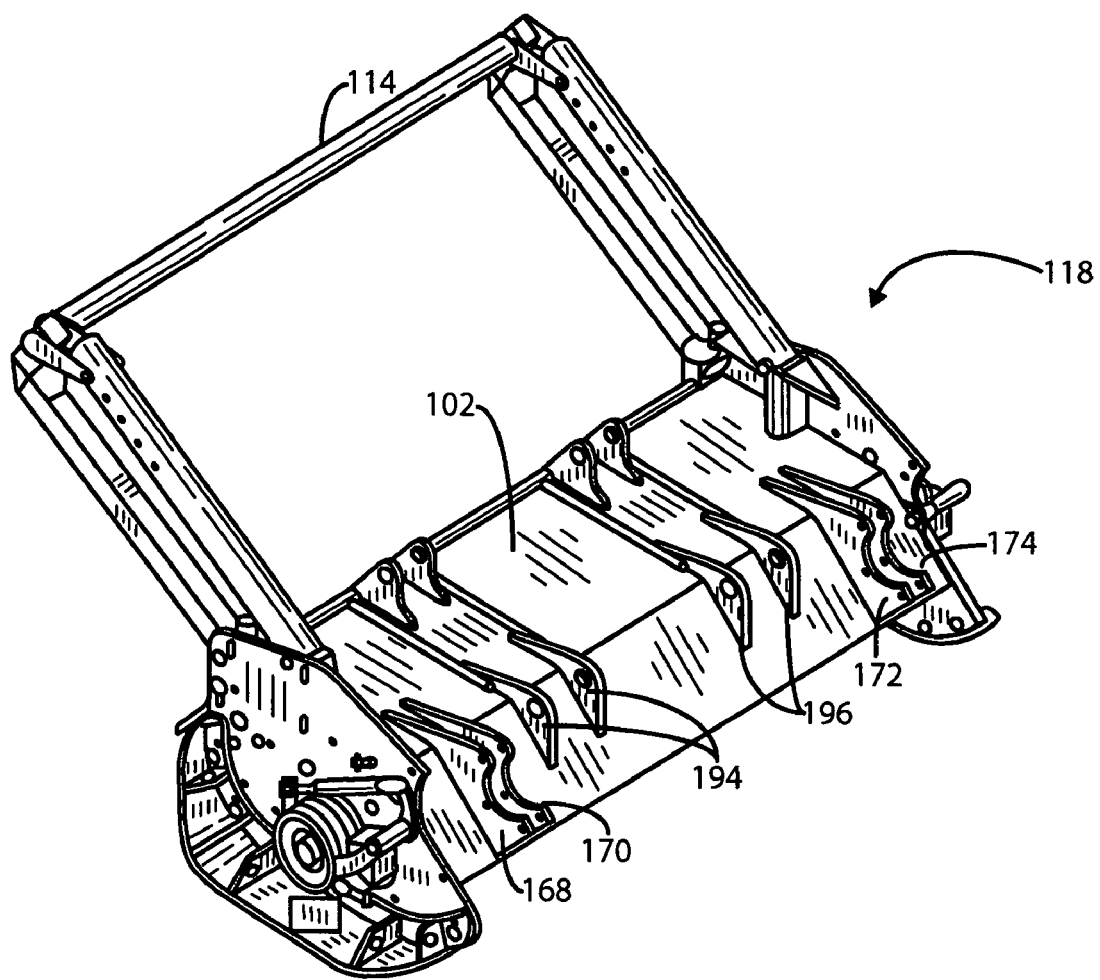
FIG. 10 is a perspective detail view of the movable frame portion.

Unlike the embodiment of FIGS. 1–5, the alternative embodiment now being described comprises a first stationary frame member indicated generally by numeral 116, the details of which are best seen in the perspective view of FIG. 9, and a movable frame portion indicated generally by numeral 118, the details of which are shown in FIG. 10. The fixed frame assembly 116 and the movable frame assembly 118 are joined together by rotary hinges 120 and 122 in a manner that will next be explained.

The movable frame member 116 comprises a base plate 124 to which are welded first and second pairs of vertically extending support plates 126 and 128. Welded or otherwise affixed to the base plate 124 and projecting generally vertically upward therefrom are parallel support posts 130 and 132 and connected between the upper ends thereof is a cross member 134. Extending between the support posts 130 and 132 near the lower ends thereof is a horizontal strut 136 formed from square tubing that passes through aligned square openings as at 138 formed through the parallel support plates 126 and 128.

The base plate 124 has a forwardly projecting shelf 140 and sitting on the shelf 140 is a gear box 142. It has an input shaft 144 that is adapted to be connected to a PTO shaft of the work vehicle on which the tree cutting attachment of the present invention is to be used. The input shaft 144 has a bevel gear (not shown) secured thereto that meshes with another pair of bevel gears within the box 142. The output bevel gears are affixed to colinear output drive shafts 146 and 148. Secured to the outer ends of the drive shafts 146 and 148 are belt pulleys 150 and 152, respectively. The outer ends of the drive shafts 146 and 148 are journaled for rotation in bearing blocks as at 154 that are bolted to gussets 156 that, in turn, are welded to the base plate 124.

With continued reference to FIG. 9, the stationary frame member assembly 116 shows segments of rectangular tubing 158 and 160 surrounding the drive shafts 146 and 148, respectively, thus acting as shields to prevent any buildup or dirt and wood particles about the rotating shafts when being driven by the machine's power takeoff through the gearbox 142. The drive shafts 146 and 148 also pass through bearings disposed in the hinge members 120 and 122. These hinges are generally in the shape of spools having end flanges, as at 160 and 162, at opposed ends of a central tubular core 164. The end flanges of the hinges 120 and 122 bolt to hinge plates as at 168 and 170 that are welded to the shroud 102. Similarly, the end flanges of the hinge member 122 bolt to the support plates 172 and 174 that are welded to the shroud 102. From what has thus far been described, those skilled in the art will appreciate that the movable frame assembly 118 can be made to pivot with respect to the stationary frame assembly 116 where the pivoting takes place about the axes of the drive shafts 146 and 148.

Figure 8:
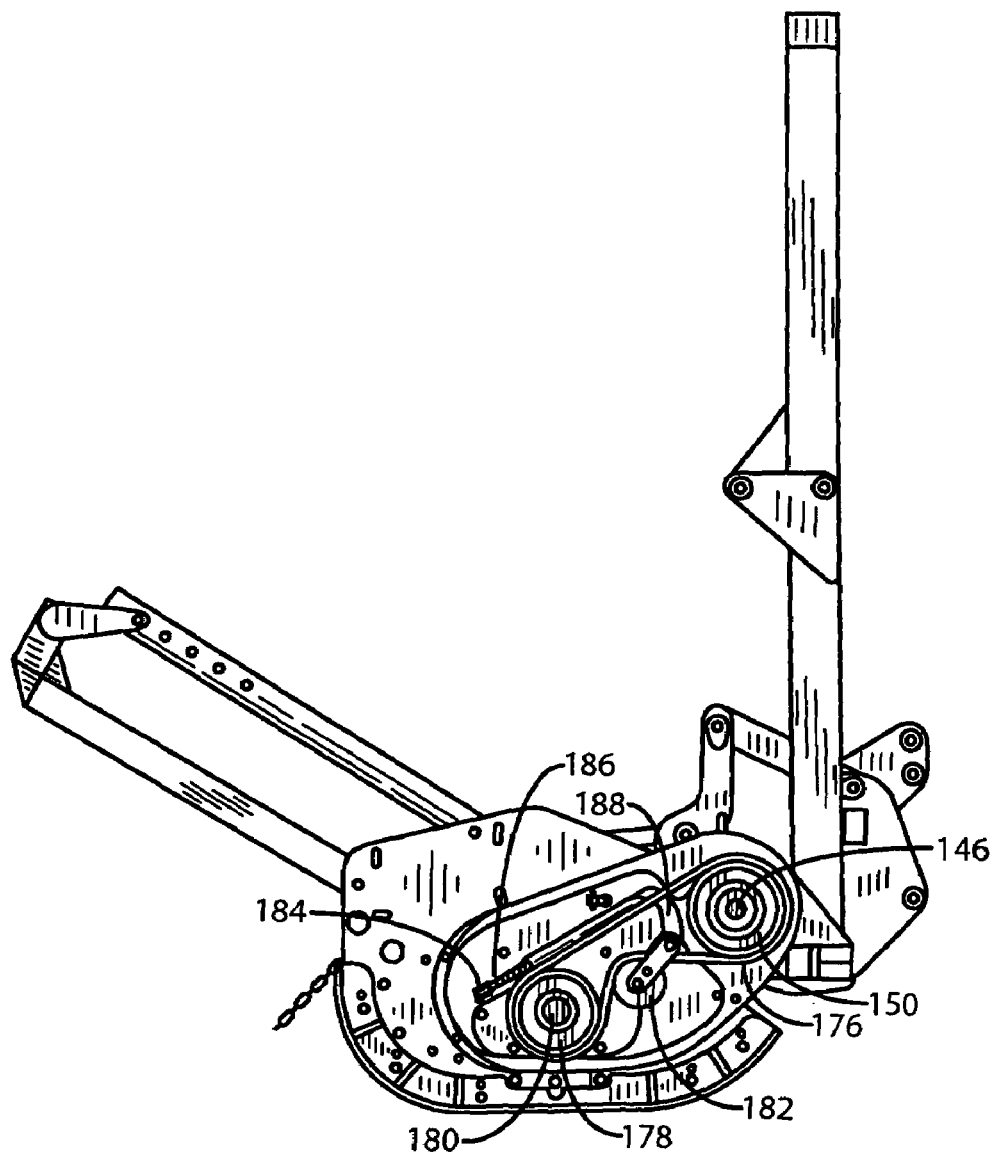
FIG. 8 is a right side view of the embodiment of FIG. 6 with the guard removed to reveal the drive train for the rotor.

Turning next to the end view of FIG. 8, it will be seen that the output shaft 146 on which the drive pulley 150 is secured has an endless belt 176 deployed about it. The belt 176 also is deployed about a pulley 178 that is secured to the shaft 180 of the cutting blade rotor assembly. A belt tensioning wheel 182 also engages the belt 176 where the amount of tension can be adjusted by tightening or loosening a nut 184 on the end of threaded rod 186 coupled through lever 188 to the tension wheel 182 much as was earlier described in connection with the embodiment of FIGS. 1–5. In an identical manner, an endless belt arrangement is entrained about the drive pulley 152 and about a pulley (not shown) on the right side of the tree cutting attachment when viewed as in FIG. 6. Thus, torque is applied at opposed ends of the blade supporting rotor.

In order to pivot the movable frame assembly 118 relative to the stationary frame assembly 116, linear actuators, here shown as hydraulic cylinders 190 and 192, are provided. The pivot linkages actuated by the hydraulic cylinders 190 and 192 can be seen both in the perspective view of FIG. 6 and the top plan view of FIG. 7. However, referring momentarily to FIG. 10, there is shown first and second pairs of ears as at 194 and 196 welded to the shroud 102 of the movable assembly 118. The ears are in parallel, spaced relation and each includes an aperture extending through the thickness dimension thereof. Located between the ear pair 194 is a bell crank 198 that is pivotally joined to the ears 194 by a hinge pin 200 that passes through the apertures in the ears and through the bell crank. The upper end of the bell crank arm 198 is likewise pivotally joined to a linkage 202 by a hinge pin 204. The opposite end of the linkage 202 is pivotally secured to the support plate pair 126 by a hinge pin 204. The piston rod 191 of the hydraulic cylinder 190 has a clevis 193 secured to it and the clevis couples to a pivot pin affixed to the bell crank member 198. In the same manner, identical linkages couple the fixed frame member 116 to the movable frame member 118 where the cylinder 192 acts in unison with the cylinder 190 in serving to pivot the movable frame member 118 about the drive shafts 146 and 48 as a center.

OPERATION

Figure 11A:
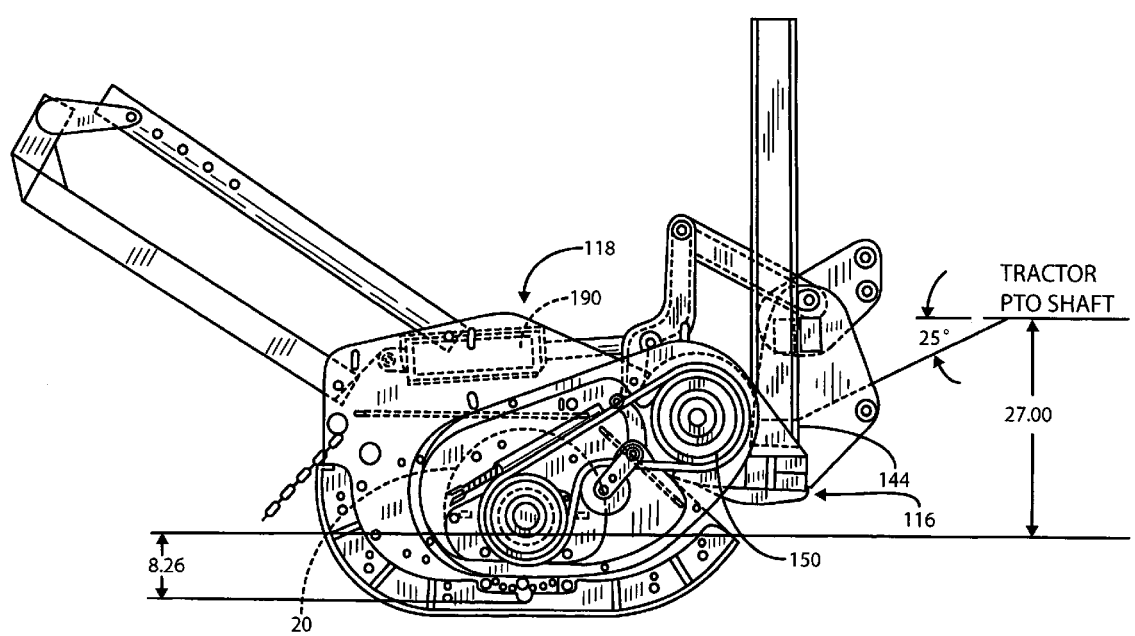
FIGS. 11A and 11B demonstrate the limited range of cutting height adjustment on conventional (non-pivoting) cutters, using a maximum PTO angle of 25 degrees up and down as a reference only, for this comparison.

Referring next to FIGS. 11A–11D, consideration will next be given to the operating features of the alternative embodiment of the invention. In FIG. 11A, the movable frame member 118 containing the cutting blade rotor is resting on the ground and the gearbox input shaft 144 is adapted to be driven by a tractor's PTO shaft. The PTO shaft is typically at a fixed elevation of about 27 inches relative to ground. By using a universal joint between the tractor PTO shaft and the gearbox input shaft 144, a declination angle of about 25° may be accommodated. As the gearbox input shaft 144 is driven, bevel gears in the input gearbox 142 drive the shafts on which the belt pulleys 150 are mounted. The rotor assembly (FIG. 5) carrying the cutting blades is driven via belts 176 to reduce brush and stubble at ground level to small chips.

Figure 11B:
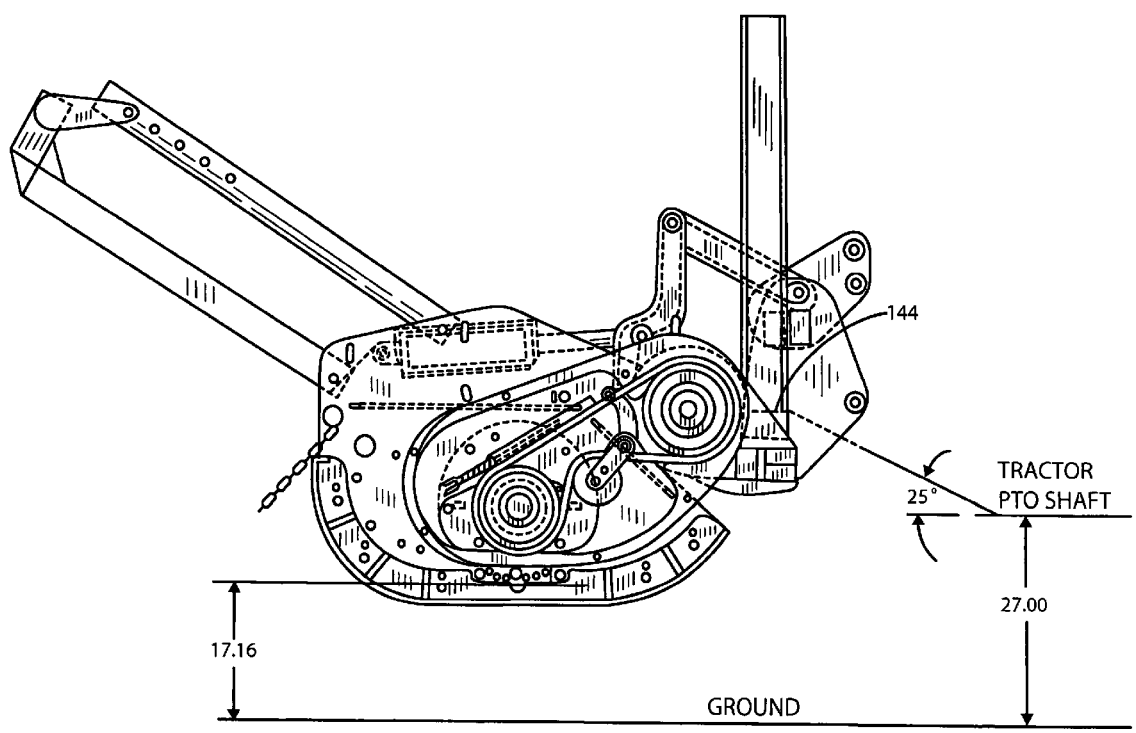

FIG. 11B is included to show that the tractor vehicle may elevate the cutting attachment assembly 100 proximately 17 in. above ground level while still maintaining the ability to drive the gearbox shaft 144 from the vehicle's power takeoff shaft through a suitable U-joint connection. In this attitude, the cutter assembly can avoid ground irregularities that might be encountered in passing over rough terrain.

Using approximately a 25 degree angle (up or down) as a reasonable working limit on a typical PTO driveline, FIGS. 11A and 11B demonstrate the limited range of cutting height adjustment on conventional (non-pivoting) cutters to be approximately 8" below ground level (FIG. 11A) to approximately 17" above ground level (FIG. 11B).

Figure 11C:
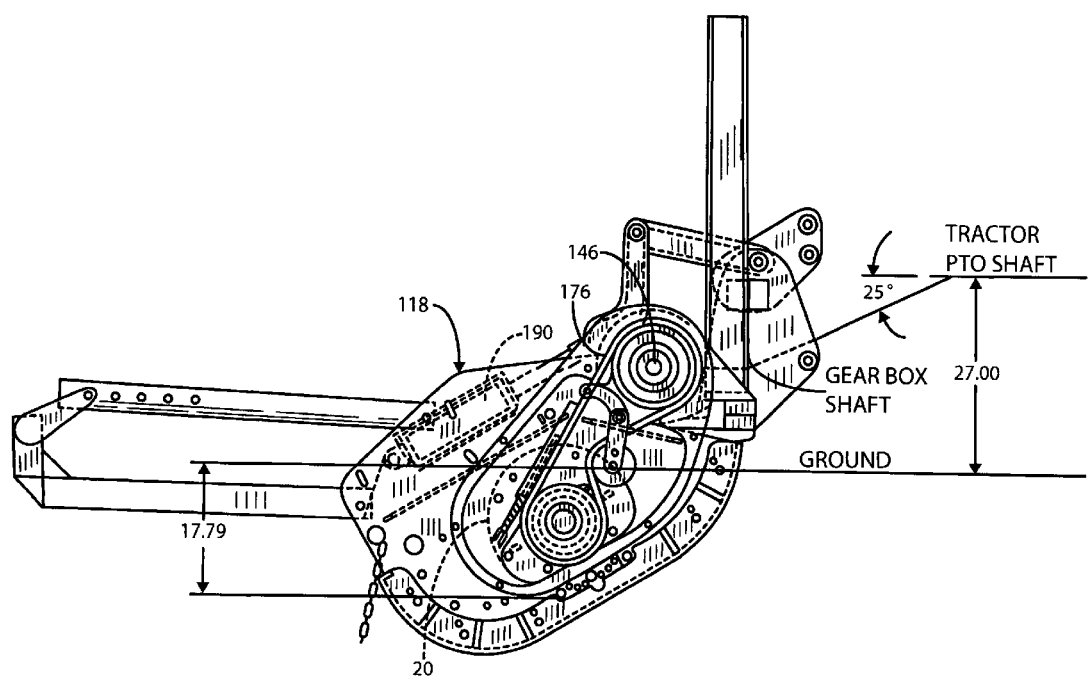
FIGS. 11C and 11D demonstrate the improved range of cutting height adjustment provided by the pivoting capability of this invention, using the same reference angels of 25 degrees up and down.
Figure 11D:
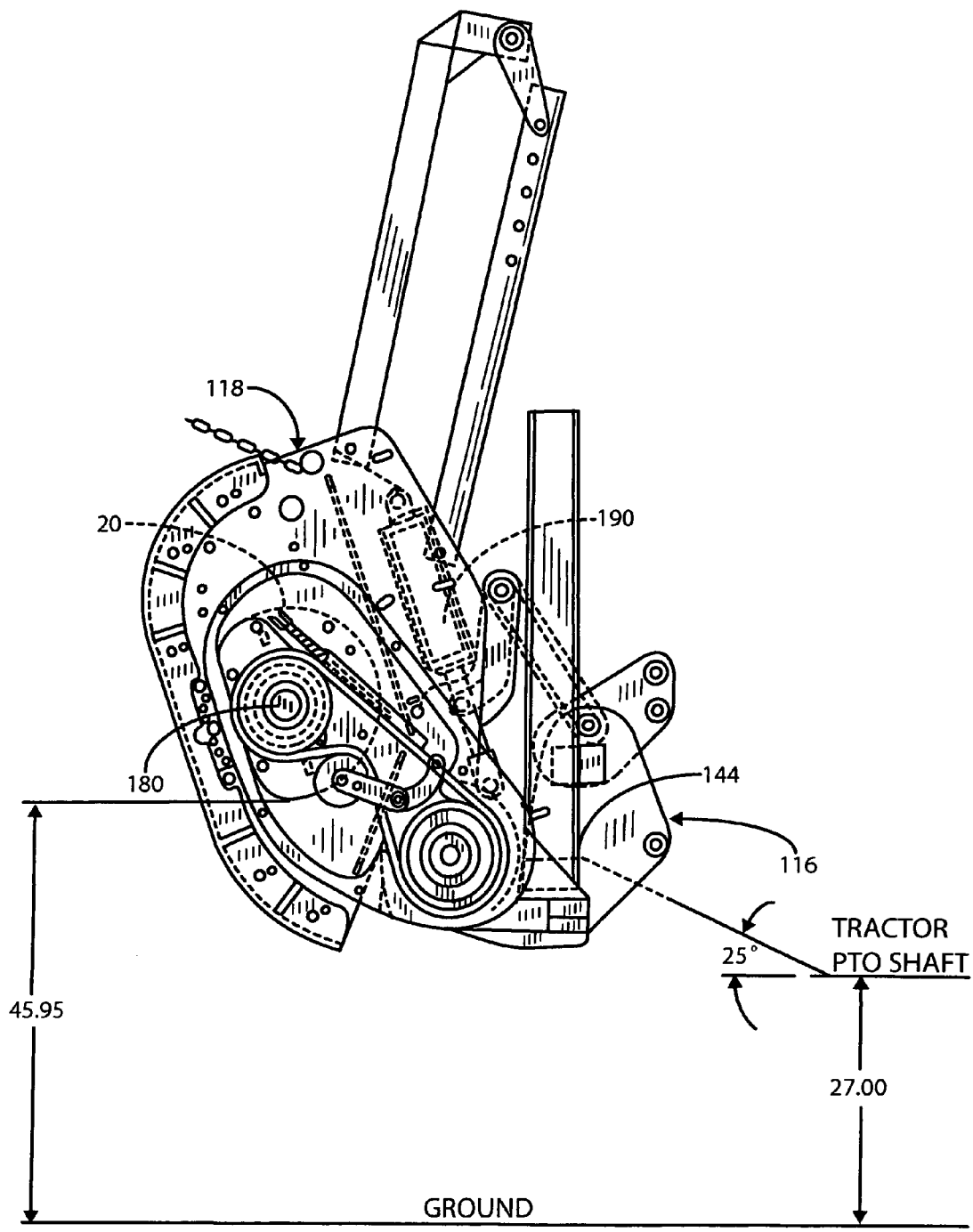

FIGS. 11C and 11D demonstrate the improved range of cutting height adjustment provided by the pivoting capability of this invention, while still maintaining the same working angles of 25 degrees up or down. FIG. 11C shows approximately 18" below ground level and FIG. 11D shows approximately 46" above ground level.

The increased cutting height allows the operator to process more of the standing tree trunk while it is still anchored to the ground by its roots, providing a more efficient cutting action compared to the lower cutting height leaving more of the heavy, lower trunk to be processed after the tree is laying down, separated from the roots. It is important to note that because the pivot axis is about the drive shafts 146 and 148, there is no change in belt tension for the drive belt 176.

Lastly, turning to FIG. 11D, it is shown that by retracting the piston rods into the cylinders 190 and 192, the resulting force, acting through a bell crank linkages will tip the movable frame assembly 118 relative to the fixed frame assembly 116 to thereby elevate the effective centerline of the cutting blade rotor 20. This attitude of the movable frame assembly provides improved purchase to the trunks of larger diameter trees which may typically be at a point approximately 4 ft. above the ground. The pusher bar 114 tends to cause the tree to fall forward as the work vehicle is driven and in some instances where the tree trunk tips rearward toward the cab of the work vehicle, the crossbar 134 serves to keep the tree trunk from coming down on the vehicle's cab. Once the tree has been felled, the hydraulic cylinders 190 and 192 can again be actuated to place the cutting blade rotor in the disposition shown in FIG. 11B as the vehicle slowly moves over the tree trunk and the cutting blades completely reduce the tree trunk to small chips.

The rotary, pivoting motion provided by this invention provides further advantage by being able to angle the cutting head up and down to better follow the contour of uneven ground.

Also, by rotating the cutter up and back, the operator is able to better expose the cutting blades to the standing tree as the front deflector shield and anvil components rotate back and away from the immovable tree trunk.

Finally, the ability to rotate the cutting head allows for varying the angle of attack of the anvil to the cutting drum to improve feeding of irregularly shaped trees and limbs.

All of the listed advantages are accomplished while keeping the geometry of the PTO driveline connecting the tractor to the implement within the limits widely accepted in the industry, throughout the full range of motion.

This invention has been defined herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself. For example, rather than driving the rotor 20 with a hydraulic motor, it may also be mechanically coupled directly to a power take off of the self-propelled work vehicle to which the tree/brush cutter is connected.

What is claimed is:

1. A tree cutting attachment for a self-propelled work vehicle comprising, in combination:
   (a) a stationary frame adapted to be coupled to a work vehicle;
   (b) a movable frame hinged to the stationary frame;
   (c) a rotor assembly journaled for rotation within said movable frame, the rotor assembly including a central driven shaft with an end plate proximate opposed ends thereof and a plurality of intermediate, regularly spaced support plates, said support plates being held in parallel spaced relation by a plurality of equally circumferentially spaced bars extending between the end plates;
   (d) first and second pluralities of generally rectangular cutting blades being individually mounted between adjacent support plates in side-by-side relation;
   (e) means operatively coupled between the stationary frame and the movable frame for pivoting the movable frame relative to the stationary frame about a central driving shaft on the movable frame that is laterally offset from the central driven shaft; and
   (f) a driven means coupled in driving relation to the central driving shaft, said central driving shaft being coupled to the driven shaft of the rotor assembly and adapted to rotate the rotor assembly in a direction tending to lift a downed tree from the ground.

2. The tree cutting attachment as in claim 1 wherein the first and second of the plurality of blades extend in a direction generally tangent to a periphery of the rotor assembly.

3. The tree cutting attachment as in claim 2 and further including a plurality of blade supports affixed to the rotor and connected to adjacent ones of said plurality of support plates, said blades being attachable to individual ones of said plurality of blade supports.

4. The tree cutting attachment as in claim 1 and further including a shear bar affixed to said movable frame and extending parallel to the rotor assembly proximate a periphery of the rotor assembly, the shear bar being adjustable relative to a sharpened front edge of the cutting blades whereby a gap between the cutting edge of the blade and shear bar can be adjusted.

5. The tree cutting apparatus as in claim 1 and further including a debris deflector affixed to the movable frame.

6. The tree cutting apparatus as in claim 5 wherein the debris deflector comprises a plurality of chain segments suspended at one end from a transversely extending member.

7. The tree cutting apparatus as in claim 1 and further including a pusher assembly affixed to the movable frame and extending forward thereof for applying a force to a tree trunk being severed by the cutting blades on the rotor assembly to give a preferential direction to a tree being felled.

8. The tree cutting apparatus as in claim 1 wherein the driven means comprises a power take-off of said work vehicle.

9. The tree cutting apparatus as in claim 1 wherein the central driven shaft of the rotor assembly is adapted to be mechanically coupled to a power take-off of the self-propelled work vehicle.

10. The tree cutting apparatus as in claim 1 wherein the central driven shaft of the rotor assembly is adapted to be coupled to a power take-off of the self-propelled work vehicle, the power take-off being connected to an input shaft of a gearbox, said gearbox having first and second oppositely directed output shafts forming parts of said central driving shaft.

11. The tree cutting apparatus as in claim 1 wherein the means for pivoting the movable frame comprises at least one linear actuator operatively coupled between the stationary frame and the movable frame for pivoting the movable frame relative to the stationary frame about the central driving shaft as a center.

12. The tree cutting apparatus of claim 11 wherein the linear actuator comprises a hydraulic cylinder.

13. The tree cutting apparatus of claim 1 wherein the stationary frame includes a hitch member for coupling the stationary frame to the work vehicle.

14. The tree cutting apparatus of claim 10 wherein the hinge comprises a spool having first and second end flanges affixed to brackets attached to the movable frame and a tubular core extending between the first and second end flanges, the tubular core being in surrounding relation with respect to the central driving shaft and pivotable thereabout.

15. The tree cutting apparatus of claim 10 and further including belt pulleys affixed to opposed ends of the central driven shaft of the rotor assembly and to said oppositely directed output shafts of said gear box and endless belts deployed over the belt pulleys affixed to the opposed ends of the central driven shaft of the rotor assembly and the belt pulleys on the oppositely directed output shafts of the gear box.

* * * * *